No. 640,669. Patented Jan. 2, 1900.
A. B. LANDIS.
GRINDING MACHINE.
(Application filed Oct. 14, 1899.)
(No Model.) 8 Sheets—Sheet 2.

Witnesses
Franck L. Ourand
C. B. Gossrow

Inventor
Abraham B. Landis,
per, E. W. Bradford
Attorney

No. 640,669. Patented Jan. 2, 1900.
A. B. LANDIS.
GRINDING MACHINE.
(Application filed Oct. 14, 1899.)
(No Model.) 8 Sheets—Sheet 3.

Fig. 3.

WITNESSES:

INVENTOR

No. 640,669. Patented Jan. 2, 1900.
A. B. LANDIS.
GRINDING MACHINE.
(Application filed Oct. 14, 1899.)
(No Model.) 8 Sheets—Sheet 5.

No. 640,669. Patented Jan. 2, 1900.
A. B. LANDIS.
GRINDING MACHINE.
(Application filed Oct. 14, 1899.)
(No Model.) 8 Sheets—Sheet 6.

No. 640,669. Patented Jan. 2, 1900.
A. B. LANDIS.
GRINDING MACHINE.
(Application filed Oct. 14, 1899.)

(No Model.) 8 Sheets—Sheet 8.

Witnesses
Franck L. Ourand.
C. B. Gosorn.

Inventor
Abraham B. Landis,
per
R. W. Bradford
Attorney

UNITED STATES PATENT OFFICE.

ABRAHAM B. LANDIS, OF WAYNESBOROUGH, PENNSYLVANIA.

GRINDING-MACHINE.

SPECIFICATION forming part of Letters Patent No. 640,669, dated January 2, 1900.

Application filed October 14, 1899. Serial No. 733,583. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Grinding-Machines, of which the following is a specification.

My said invention relates to grinding-machines of that character shown in Letters Patent Nos. 483,288 and 544,439, and others heretofore granted to me; and it consists in various improvements in the construction and arrangement of the mechanism for mounting and operating the emery-wheel, whereby greater accuracy is secured, the operation of the machine simplified, and more perfect results are accomplished, all as will be hereinafter more fully described and claimed.

Referring to the accompanying drawings, which are made a part hereof, and on which similar reference characters indicate similar parts, Fig. 3, a top or plan view of the emery-wheel mountings and operating mechanism.

In said drawings the portions marked A represent the bed or frame of the machine; B, the carriage; C, the swiveled slide; D, the slider, mounted to slide thereon, and E the emery-wheel base, mounted on said slide.

The bed or frame A is of any approved form and construction, as is also the carriage B, which is provided with a toothed rack $b$ on its under side, with which a pinion on the end of driving-shaft 1 engages, said shaft 1 being driven from any appropriate power through suitable gearing. (Not shown.)

Figures 4, 5, 6:
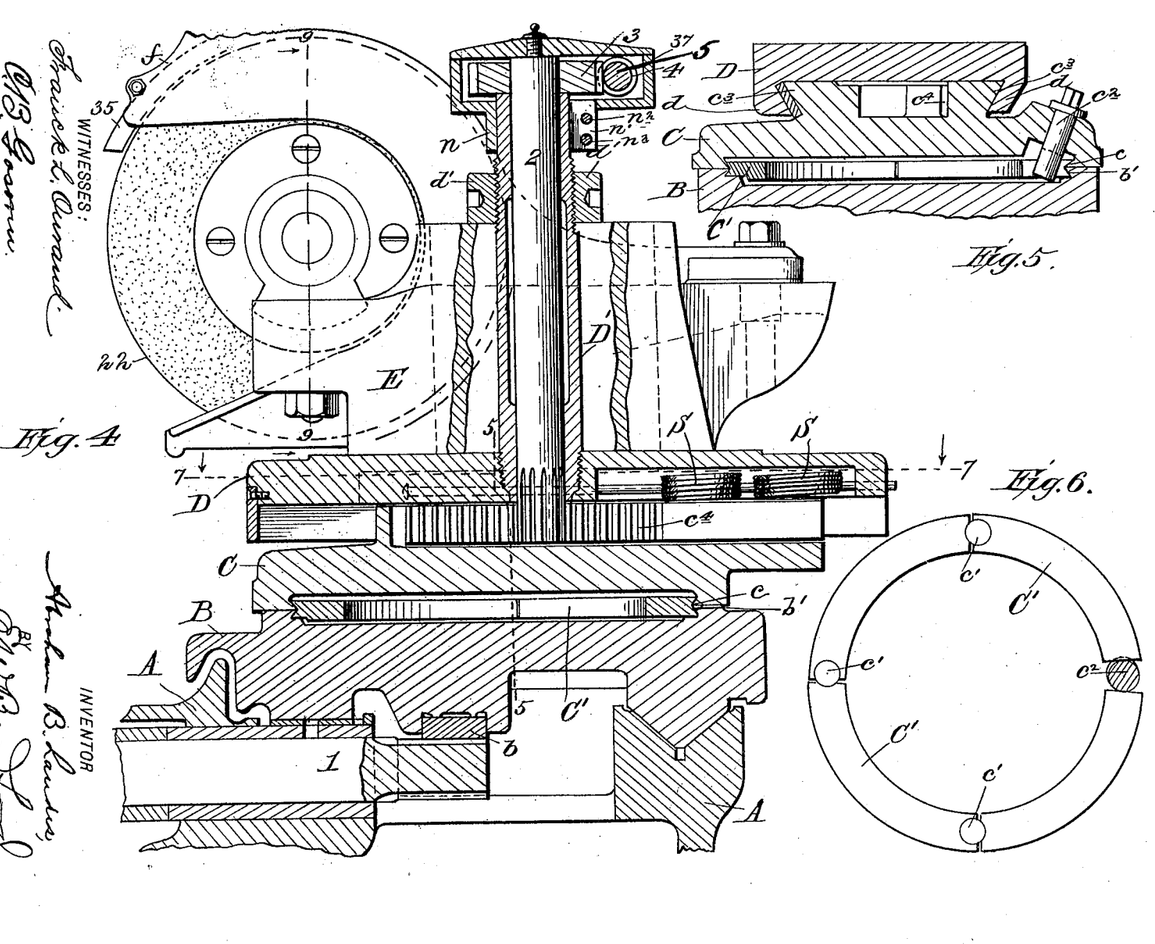
Fig. 4, a vertical section through the same as seen when looking in the direction indicated by the arrows from the dotted line 4 4 in Fig. 3.
Fig. 5, a detail section on the dotted line 5 5 in Fig. 4.
Fig. 6, a plan view of the clamping-ring for securing the swiveled slide carrying the emery-wheel base to the carriage.
Figure 5:
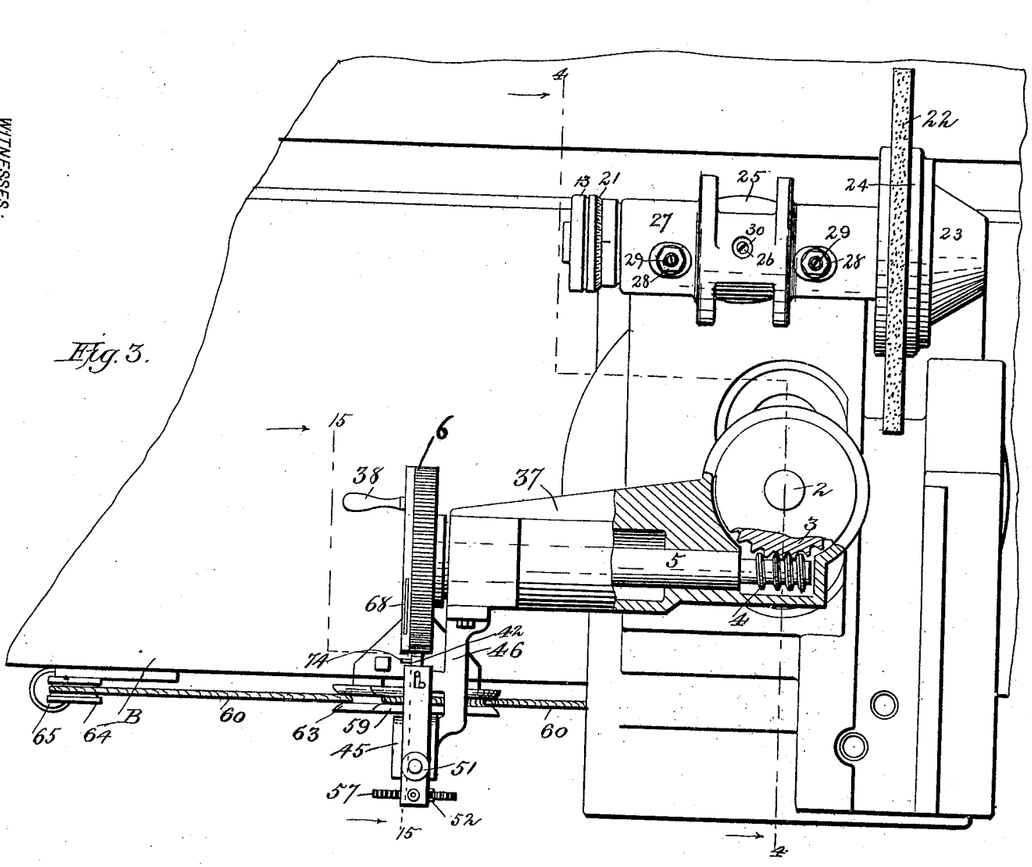

The part C is mounted to swivel on the carriage and is provided with ways on which part D slides, and I have termed it the "swiveled slide." It is recessed on its under side and has a circular flange $c$ around said recess, which flange is formed with a tapered top face. The carriage B is similarly recessed in its top face, and a similar flange $b'$ is formed around its edge, being tapered under. The faces of the two parts are dressed smooth at this point, and the two flanges coming together form a V-shaped flange or rib extending into the recess between the two parts. A clamping-ring C', preferably composed of several sections, as best shown in Fig. 6, is formed with a V-shaped groove in its periphery and engages said rib composed of said two flanges, as best shown in Fig. 4. The adjacent ends of the several sections of said ring are formed with notches in the form of a circle, more than half of the circle being in one part and having a disk $c'$ set therein, which engages with the notch in the adjacent part and insures that when they are forced together they will form a perfect circle and the edges of each be in the same circle as the edges of the others. Between two of the parts is left considerable space, and in this is mounted the lower end of a clamping-pin $c^2$, which lower end is cam-shaped or in the form of an ellipse at its portion between said parts. Its upper portion is circular and journaled in suitable bearing formed in the part C and has a squared top for receiving a wrench for turning it. The ring is first placed on its seat in the recess in the top of carriage B, contracted as permitted by the space left for pin $c^2$. The part C is then put in place and the lower end of pin $c^2$ inserted flatwise between the ends of said sections. It is then given a turn with a wrench until the ring is expanded sufficiently to secure part C firmly in place. By turning said pin tightly the ring will be expanded to clamp the parts B and C firmly together; but by loosening it slightly the part C may be permitted to swivel on part B, while being at the same time securely and evenly held in place. By this means said part is supported near its outer edge, where it has the widest bearing, and is also clamped at every point around the entire circle, thus securing the same against vibration between the surfaces, which is essential to good work. Because of the delicate character of the work which these machines are designed to do this is important. On the top of said slide is formed a portion with straight parallel sides having cut under edges $c^3$, which form the track or ways on which the slider D is mounted. The central portion of said straight part is cut out, forming a recess or groove with edges parallel with the tracks $c^3$. On one side of said recess is formed a toothed rack $c^4$ for a purpose which will be presently described.

Figures 7, 8:
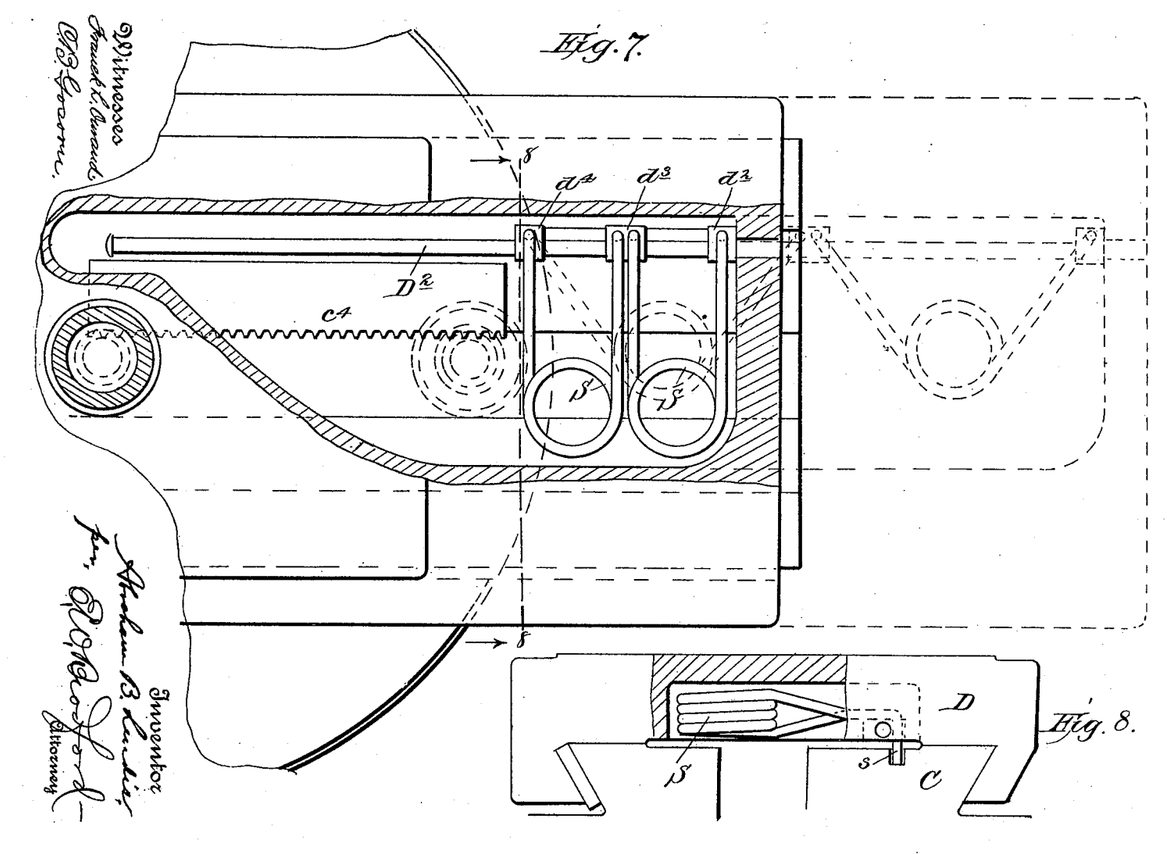
Fig. 7, a horizontal section on the dotted line 7 7 in Fig. 4 looking downwardly, as indicated by the arrows.
Fig. 8, a cross-section through the same looking in the direction indicated by the arrows from the dotted line 8 8 in Fig. 7.
Figure 9:
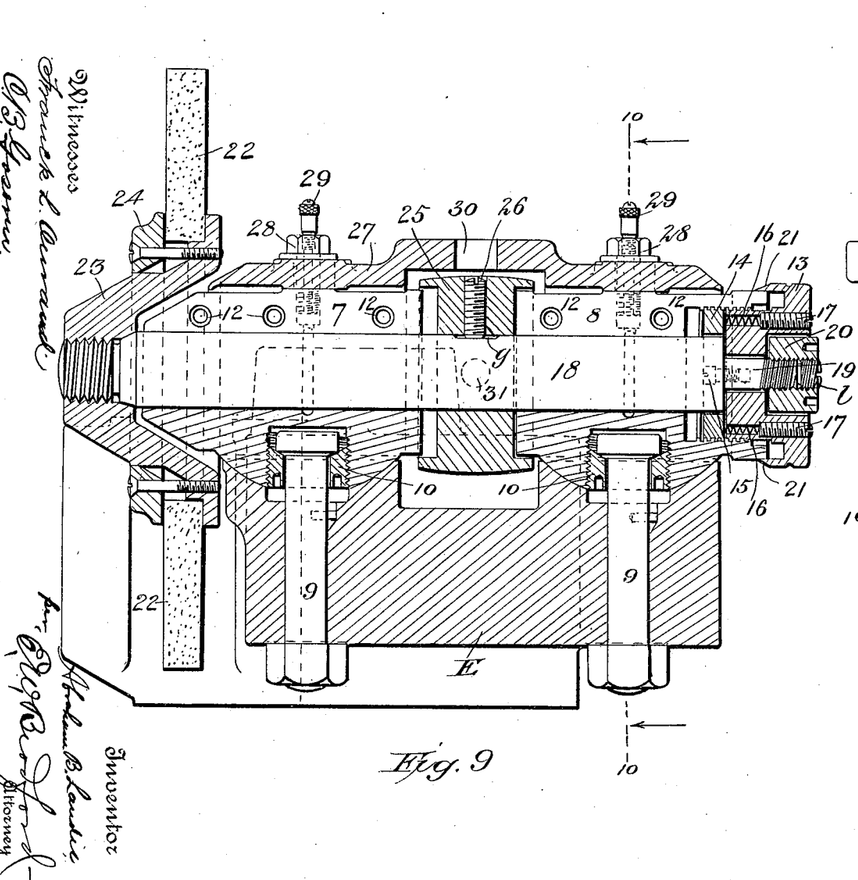
Fig. 9, a central longitudinal section through the emery-wheel bearings as seen when looking in the direction indicated by the arrows from the dotted line 9 9 in Fig. 4.
Figure 10:
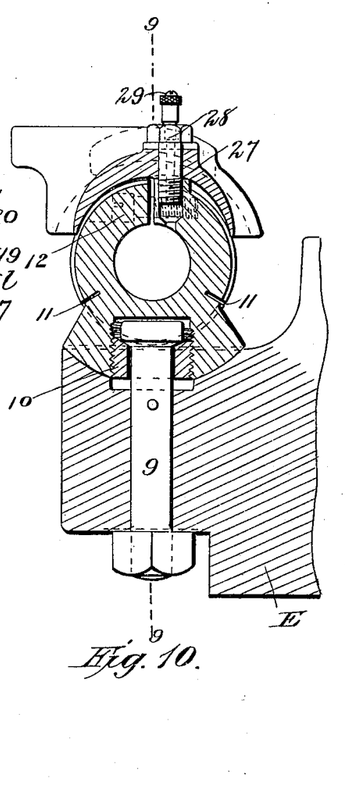
Fig. 10, a transverse section through the same as seen when looking in the direction indicated by the arrows from the dotted line 10 10 in Fig. 9.
Figures 11, 12, 13, 14:
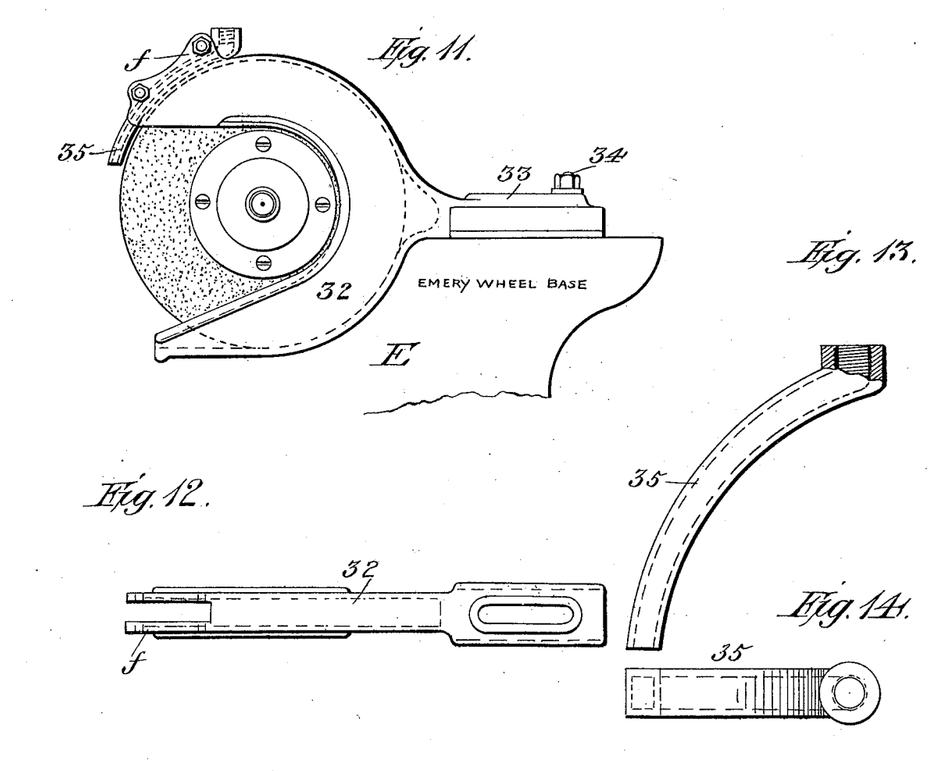
Fig. 11, a side elevation of the emery-wheel and its hood.
Fig. 12, a top or plan view of said hood.
Fig. 13, a side elevation of the water-supply nozzle.
Fig. 14, a plan view of the same.

The part D has flanges $d$ on its sides with inwardly-tapered faces, which engage with the ways $c^3$ on part C, and is thus adapted to slide thereon, and I have termed this part the "slider." The wheel-base E is mounted on the top thereof, being secured thereto by a hollow standard D', which at its lower end is screw-threaded and engages with a screw-threaded perforation in the central portion of slider D and at its top end is screw-threaded and has a nut $d'$ thereon, which clamps said base to said slider. Said standard D' extends through an elongated vertical aperture in said base, and the nut is of sufficient size to bear upon its edges. By loosening said nut said base can be adjusted longitudinally of said slider (as may be necessary for the use of different-sized emery-wheels) and work, as will be readily understood. The under side of said slider is recessed longitudinally and has mounted therein one, two, or more springs S. Said springs are preferably of the form shown, consisting of a coil with each end extending out therefrom straight for a distance. Said ends are bent downward at their points and engage perforations in collars or blocks $d^2$, $d^3$, and $d^4$ on rod $D^2$. Said rod extends longitudinally of said recess, one end being mounted in a perforation in the end of the casting and the other end sliding through block $d^4$. The block $d^2$ has one end of one spring S connected thereto and bears against the end of the slider. The block $d^4$ is mounted in a fixed position by reason of the end $s$ of the spring which engages therewith extending down through a perforation therein and into a socket into the swiveled slide C beneath, as shown in Fig. 8. The block $d^3$ is mounted midway between the other two and has the adjacent ends of the two springs connected therewith. It will thus be seen that the normal tendency of the springs is to force back the slide D and carry the emery-wheel away from its work, as its strain is exerted between the anchored block $d^4$ and the outer end of said slide. A vertical shaft 2 is journaled in the hollow standard D' and has a pinion on its lower end, which engages with the rack $c^4$ on the part C. Said shaft is operated through a gear 3 on its top, a worm 4 on a horizontal shaft 5, which engages therewith, and an operating-wheel 6 on said shaft 5. By this means said slider, with the emery-wheel mounted thereon, is fed to the work, and said springs serve at all times to hold the parts under tension, so that there will be no lost motion between them, and also to hold said parts back, so that no jar or vibration is permitted to throw the wheel forward into the work, and thus injury to the work from this cause is prevented. By reason of the peculiar form of the springs I secure a substantially uniform tension at all times when the carriage is extended, as indicated by dotted lines, as when close up, as shown by whole lines. As the springs expand their tension decreases; but the changing angle to the work gives them increased resistance power, while as they are contracted their leverage resistance becomes less, but their tension increases, thus maintaining a substantially uniform tension with the consequent advantages.

The emery-wheel base E is of suitable form to support the several parts mounted thereon and sufficiently rigid and heavy to support the parts steadily and free from vibration. It is adjustably secured on the slider, as above described. On its front end are mounted the bearings 7 and 8 for the emery-wheel shaft. Said bearings are formed on their under sides with bearing-faces in the form of spherical segments, and the same are mounted in correspondingly-formed seats in the base E. They are secured to said seats by clamping-bolts 9, which are secured in sockets in the under side of said bearings by means of sleeves 10, screwed into a screw-threaded outer end of said sockets under the heads of said bolts. The bearing faces or tops of said sleeves are preferably concave, and the bolts pass loosely therethrough, so that there will be no binding between the parts. By this arrangement the bearings are permitted to be perfectly adjusted or alined, so that there will be no binding of the shaft or undue wear of the parts. Each of said bearings is preferably a single piece of metal (phosphor-bronze is commonly used) bored of the proper size and split radially at the top. Cuts 11 are also made in the outside of the boxes, extending longitudinally thereof and into them radially for a distance sufficient to permit them to be contracted by the adjusting-screws 12, which extend through one side of the top, across the split, and into screw-threaded perforations in the other side. By this means the bearings may be kept close to the shaft at all times and the wear taken up and all lost motion or vibration in the parts thus prevented. The outer end of the rear bearing is recessed and formed interiorly screw-threaded, and a cap 13 is mounted thereon. Said cap is of peculiar form, having an annular groove in its front face, which embraces the rear edge of said bearing, and a forwardly-extending shank which is exteriorly screw-threaded and engages the interior screw-thread of said bearing. It also has on its front face a ring 14 of similar size and, in effect, an extension of said shank, except that it is screwed thereto by screws 15, which pass loosely through perforations in the ring and into screw-threaded seats in the face of the shank, a slight free movement being allowed said ring on said screws. There are two of said screws located directly opposite each other, and midway between them, on each side, is formed a longitudinal perforation through the cap 13, in the inner end of which is mounted a stiff coiled spring 16, and in the outer end of which is a holding and adjusting screw 17. The inner ends of said springs bear against the ring 14 and their opposite ends against the inner ends of said screws, tending to force the two parts 13 and 14 apart and maintaining a tension between them, which can be increased or diminished by adjusting said screws. The part is thus held as adjusted and lost motion also prevented. The emery-wheel shaft 18 is mounted in the bearings 7 and 8 and has a shank 19 on its end opposite the wheel, which is screw-threaded on its outer end. Said shank extends through a central perforation in the cap 13, forming a shoulder on the inner side of said cap, and a shoulder is formed on the outer side by the nut 20. By this nut a neat end adjustment of the shaft is made, so that said shaft will run freely and without play, said nut being locked by screw $l$. Said nut is set into a central recess in the outer face of said cap to make the shoulder-joint proof against the ingress of dirt or grit. The shaft being thus secured against end motion by the cap, the turning of said cap will, through its screw-threaded connection with bearing 8, adjust said shaft longitudinally of its bearings. On the tapered flange 21 on the outside of said cap is formed a micrometer-scale, (see Fig. 3,) and an indicating-mark is formed on the adjacent surface of the bearing. By this means the shaft can be moved the exact distance desired. Such adjustment is desired when the side of the emery-wheel is used in grinding flat surfaces or faces at right angles with the face of the wheel and is used to adjust the wheel to the work. The emery-wheel 22 is of any approved form, that shown being mounted on a metal center 23 by a clamping-ring 24, said center being secured to the end of shaft 18 by a screw-threaded connection. A pulley 25 is mounted on the shaft between the bearings 7 and 8, being secured thereto by a screw 26, which extends through a screw-threaded radial perforation therein and engages with a groove $g$ in the shaft or otherwise to secure it. Mounted on top of the bearings 7 and 8 is a hood 27, formed to cover and protect all the joints and the slot in the top of the bearings and protect them from grit and dirt. Said hood is secured in place by tubular screws 28, one of which passes through a perforation in each end thereof and down into a screw-threaded perforation in each bearing, said perforation being continued through and serving as an oil-hole for the bearing. The top of each tubular screw is preferably an oiler 29 of any approved kind for oiling the bearings. The center of said hood is provided with a hole 30, and a perforation 31 is formed in the pulley to register therewith. By this means said shaft can be held from turning by inserting a pin through said hole 30 and into said perforation, as when it is desired to fix the emery-wheel in position or remove it. The emery-wheel 22 is covered by a casing 32, except at its extreme front edge. Said casing is of much the same form as heretofore used, consisting of a casting of a form to cover most of the wheel, its front being open and sides cut back to surround the shaft. It is secured by means of a horizontal shank 33 and a bolt 34 to the wheel-base E. Its top edge is left open back for a distance and has flanges $f$ extending upwardly therefrom. Between said flanges is clamped a curved discharge-nozzle 35 of a size to fill the opening between the sides and of a form to curve around the edge of the wheel down to near the point of operation. Its top end is adapted to be connected with the water-supply pipe 36. By this arrangement the front of the casing is closed and a fender provided over the edge of the wheel down nearly to the point of operation, the water is directed exactly to the point desired, and its greatest service with the least inconvenience from splashing is secured. By reason of the opening in the upper corner of the casing it is adapted for removal by simply removing said nozzle and the bolt 34, when it can be drawn upward and rearward off from the wheel without disturbing the wheel or its adjustments at all.

Figure 1:
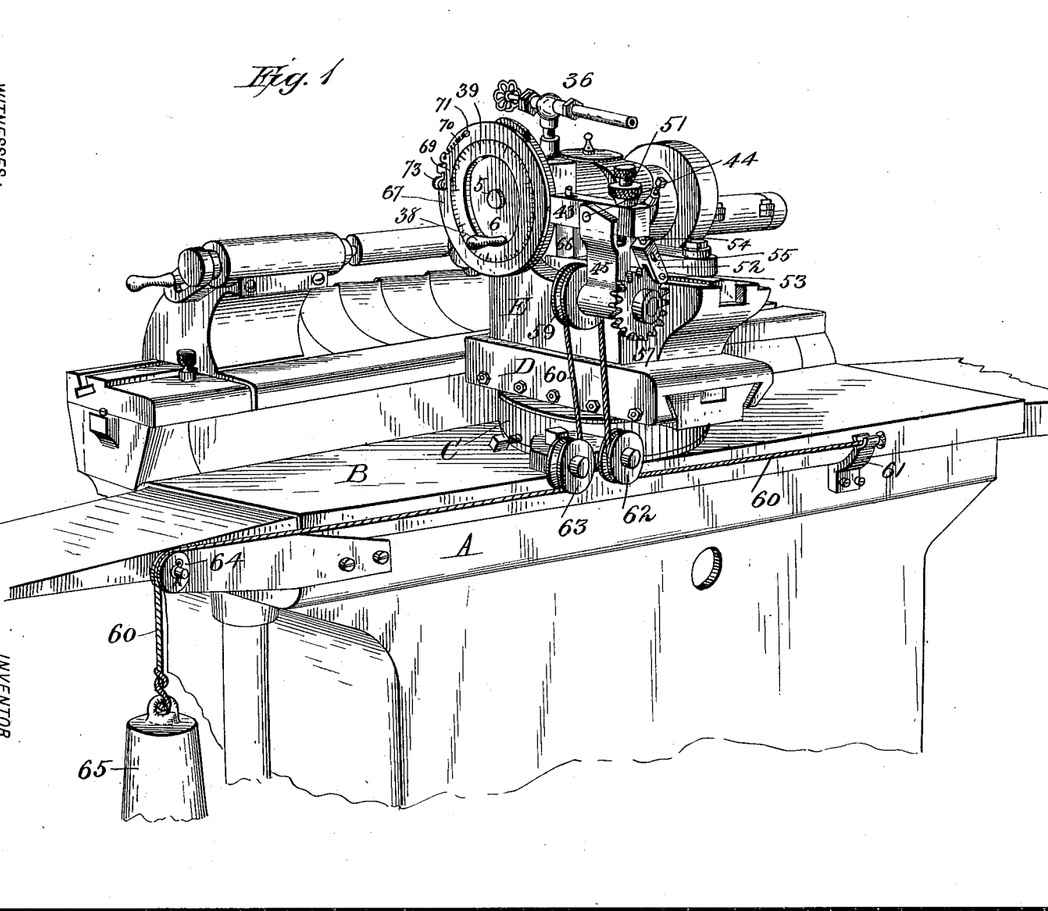
Figure 1 is a perspective view of a grinding-machine embodying my said improvements looking from the emery-wheel side of the machine toward the operating side thereof.
Figure 2:
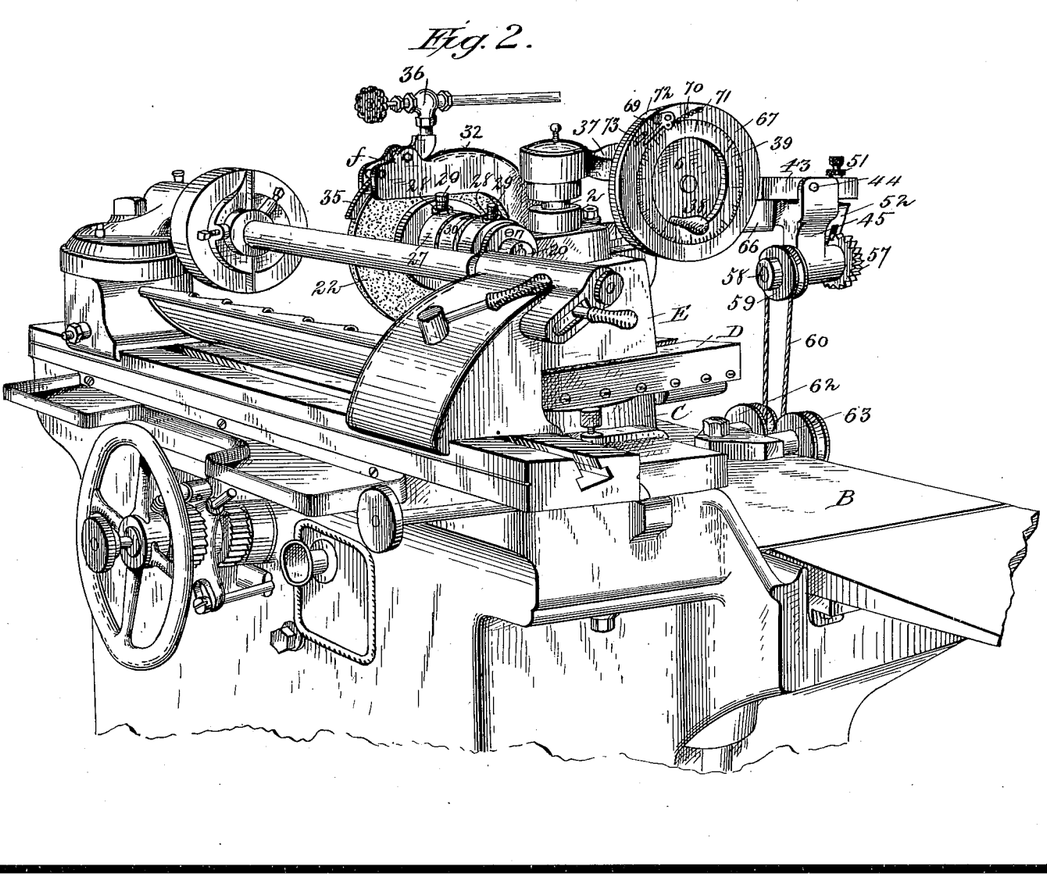
Fig. 2, a similar view as seen when looking from the opposite side of the machine.
Figures 15, 16, 17, 18, 19:
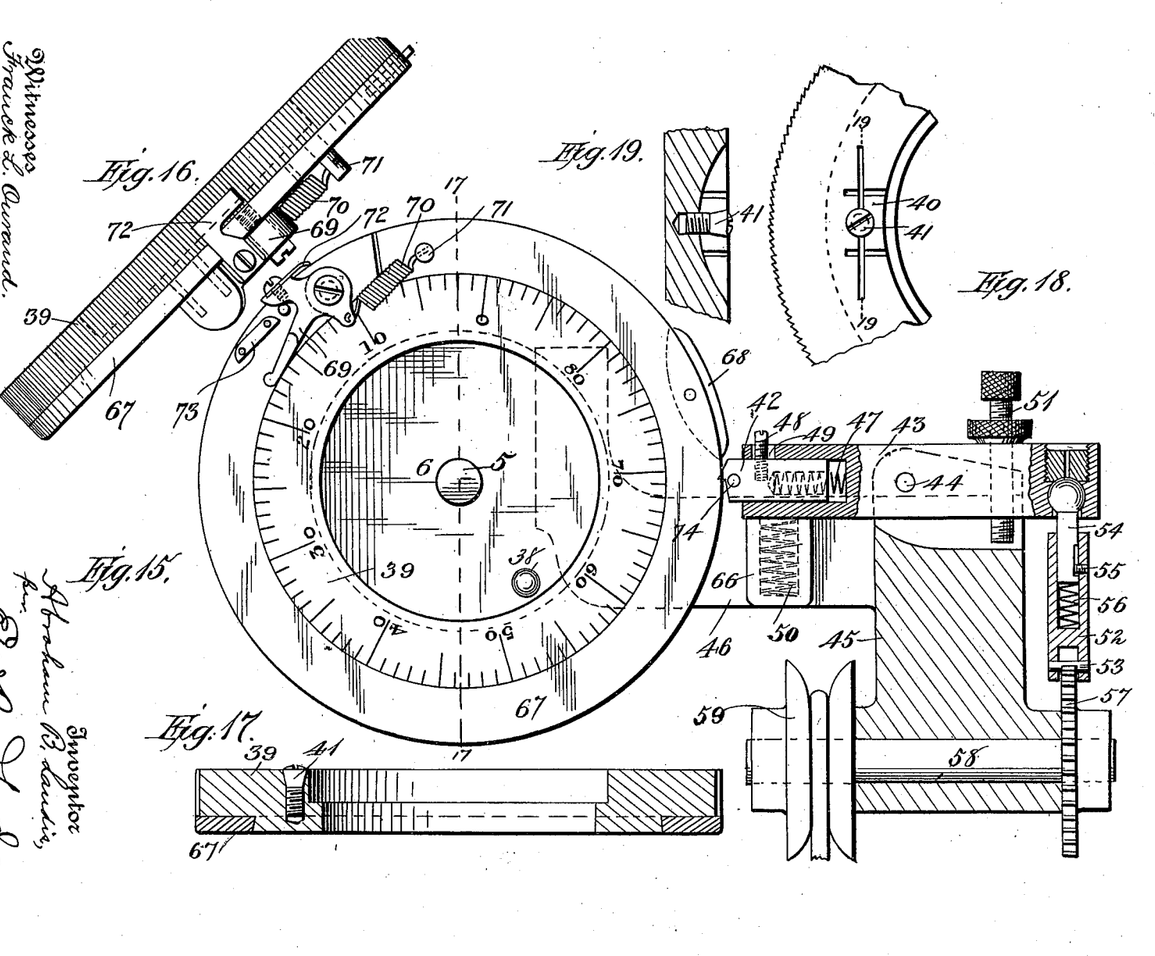
Fig. 15, a view, partly in section and partly in elevation, as seen when looking in the direction indicated by the arrows from the dotted line 15 15 in Fig. 3.
Fig. 16, an edge view of the automatic-feed-ring wheel.
Fig. 17, a section through the same on the dotted line 17 17 in Fig. 15.
Fig. 18, a detail plan view of a portion of the inside thereof, showing the construction for clamping to the main feed-wheel.
Fig. 19, a section through the same on the dotted line 19 19 in said Fig. 18.

As before described, the slider, bearing the emery-wheel base and wheel, is adjusted to feed said wheel to the work by an operating-wheel 6 through shaft 5, which has a worm engaging a gear on the top of shaft 2. Said shaft 5 is mounted in bearings in a suitably-formed casting 37, which is clamped or secured to the top of standard D' by means of a neck portion $n$ on its under side of just the size to fit said top, the same being split at one side and provided with outwardly-extending flanges $n'$ on one side, through which clamping-bolts $n^2$ extend to clamp said neck portion securely to said standard. A crank 38 on said wheel serves as a means for turning, adjusting, and feeding it by hand. By this means also the operator may turn the swiveled slide C and parts carried thereby, the shaft 5 and part 37 serving as a lever for the purpose, and at times also when it is desired to feed the wheel back and forth quickly, as when the side thereof is being used to grind against a flat surface, the clamping-bolts $n^2$ may be loosened and the casing 37 turned on the top of said standard D', which then serves as a pivot therefor. The vertical shaft 2 being locked to said casing through the gear and worm turns therewith and operates to throw the slider back and forth quickly and with the desired speed. I have, however, shown mechanism for feeding said emery-wheel to the work automatically. A ring 39 is mounted on the periphery of the wheel 6, being formed to fit thereon, its front side extending down slightly upon the face of said wheel. It is clamped in place by means of having cuts made at right angles around a small section 40 on its back side near the inner edge, and a screw-threaded perforation is formed just behind said section, in which a tapered screw 41 is mounted, which when forced in acts to force said section 40 and tightly clamp the ring and wheel together. The periphery of said ring is formed with fine transverse serrations or teeth, with which a dog 42 is adapted to engage. Said dog 42 is mounted in a socket in the end of a bar 43, pivoted on the pivot 44 in suitable bearings on a part 45, carried by a bracket 46, which is bolted to the side of the casting 37, and thus moves therewith. (See Fig. 3.) Said dog 42 is mounted in said socket to be normally forced outward against the periphery of said ring by a spring 47, which is interposed between it and the end of said socket. A pin 48 is mounted therein, extending out through a slot in bar 43, which pin serves as a means whereby said dog may be drawn out of engagement with the wheel and locked by engaging said pin with a notch in the side of said slot, as indicated by dotted lines in Fig. 3. The end of said bar bearing the dog is held upwardly by a spring 50, and its upward movement is limited by the adjusting-screw 51 in the opposite end of said bar, which is adapted to strike a portion of the part 45 beneath. By this means the limit of the swing of the bar is determined, so that the dog will pass over as many of the teeth as desired at each movement and the speed of the feed thus regulated, as will be presently described more fully. A dog 52 is connected to the outer end of the pivoted bar 43 by means of a ball-and-socket connection. It consists of a block with a bifurcated lower end, across which extends a pin or roller 53. Its upper portion is formed with a socket, in which is mounted a shank 54, having a ball formation on its upper end, which is mounted in a similarly-formed socket in the end of bar 43, as shown. A groove is formed for a distance between its ends in one side of said shank, in which a pin or lug 55, extending inward from the surrounding part 52, engages. A longitudinal movement between the parts is thus provided for. Between the lower end of the socket and the lower end of the shank is interposed a spring 56, which normally tends to keep them extended to the limit. The pin or roller 53 in the lower end of the dog engages with the teeth of a toothed wheel 57, which is mounted on the outer end of a short shaft 58, carried in suitable bearings formed in the lower portion of part 45. On the other end of said shaft is mounted a pulley 59, over which runs a rope 60. Said rope is secured at one end to a bracket 61 on the bed of the machine, (see Fig. 1,) passes under an idler-pulley 62, mounted on a bracket secured to the carriage B, passes up over said pulley 59, down and under a pulley 63 on the carriage, then down over a pulley 64, mounted on the bed A at the other end of the machine, and has a heavy weight 65 suspended thereon, which serves to keep said rope or cable taut. It will thus be seen that as said carriage travels back and forth the shaft 58 is turned first in one direction and then the other, and the engagement of the dog 52 with toothed wheel 57 will carry said dog back and forth over the top of said wheel and raise the outer end of bar 43 and depress the dog 42 on its other end and then permit it to fall continuously while the machine is in operation. As will be readily understood, every time the dog 42 is forced down it rotates the wheel 6 through its engagement with the teeth in the periphery of ring 39 a distance equal to its motion, which is determined by the proper adjustment of screw 51. In Fig. 15 the parts are shown in the position they occupy just as the dog 52 passes over the top of the wheel 57. The outer end of the bar 43 has been lifted until the opposite end has reached its rest on the top of the box 66, containing the spring 50. The spring 56 is of sufficient tension to insure that the parts will begin to operate as soon as the reverse movement begins; but the slot-and-pin connection between the parts 52 and 54 permits said part 54 to continue to raise sufficiently to pass over the wheel 57 even after the movement of the bar has reached its limit. By reason of the fine serrations or teeth in the periphery of the ring and the set-screw 51 the feed can be regulated to a very fine point. For example, it can be adjusted to feed the emery-wheel forward one-eighth of one-thousandth of an inch at each reversing-point, reducing the work one-quarter of one-thousandth of an inch at each feed, and this rate of feed can be increased by eighths as much as desired by adjusting set-screw 51 so that the dog will pass over one, two, three, or the number of teeth desired at each motion. It is understood that the motion of the dog 52 is sufficient to lift the bar 43 any suitable distance required, the slotted connection between it and the shank allowing all the extra motion needed without in any way affecting the delicate operation of the feeding mechanism. In order to set the machine to grind a predetermined number of parts of an inch and then stop automatically, I have arranged a device to throw and hold dog 42 back from engagement with ring 39 when said point shall be reached. It consists of a ring 67, mounted in a recess in the front face of ring 39, with its edge extending flush with the points of the teeth therein. At one point in its edge it has a projecting trip 68 set into a cut or recess formed therein. It is split on one side, and its interior edge is tapered somewhat to engage a dovetailed or tapered shoulder around the recess in the face of ring 39. There is sufficient spring force in the metal to allow the same to be sprung into place and to retain it. On one side of the split therein is a pivoted lever 69, having an arm extending at substantially right angles therewith on each side of the lever. The lower one of said arms is connected by a coiled spring 70 to a stud 71 on the opposite side of the split, and the upwardly-extending arm has a dog 72 secured thereto which engages with the teeth on the periphery of ring 39. (See Fig. 16.) Just above the end of lever 69 is secured a stop 73, which also serves as a thumb-rest when the lever is operated. As will be seen, by pressing said lever upward with the thumb and finger until it meets said stop the ring 67 will be turned on ring 39 preferably one notch, which will indicate one-eighth of one-thousandth-of-an-inch movement or one-quarter of one-thousandth reduction of the work. By reference to the micrometer-scale on the face of ring 39 the exact adjustment desired can be determined. It being desired to grind off a certain number of thousandths of an inch from the work in the machine, the ring 67 is set so that the trip 68 will be just the distance from the dog 42 which will be necessary to rotate wheel 6 to secure the desired result. The wheel will be gradually turned, as before described, until said trip is brought to said dog, when said trip 68 meets a transverse pin 74 on the side of said dog, which forces said dog back free from engagement with the teeth and stops the feed, as will be readily understood. The dog will play back and forth on the edge of said trip until the operator shall shift the parts. If it shall be found that the wear of the wheel has prevented the requisite reduction from being made, the ring 67 is adjusted to permit the additional feed found necessary. By this means the operation is rendered almost entirely automatic after the machine is once adjusted and put in operation.

Having thus fully described my said invention, what I claim as new, and desire to secure by Letters Patent, is—

1. In a grinding-machine, the combination, of a longitudinally-moving carriage the emery-wheel, the transversely-sliding base carrying said emery-wheel, mechanism for feeding the same also carried on said base, and means for automatically operating said feeding mechanism by the travel of the carriage, substantially as set forth.

2. In a grinding-machine, the combination of the emery-wheel, the sliding base carrying the same, mechanism for feeding said emery-wheel to the work also carried on said base, means for automatically operating said feeding mechanism, and a trip for throwing said mechanism out of operation when the feed has reached a predetermined point, substantially as set forth.

3. In a grinding-machine, the combination, of the emery-wheel, the sliding base carrying the same, mechanism for feeding said emery-wheel to its work consisting of a rack-bar, engaging-pinion and operating-gear, a hand-gear for operating said gear formed with teeth around its edge, a vibrating dog mounted to engage said teeth, and means for operating said dog by the movement of the carriage, whereby said wheel is turned and the feeding done automatically, substantially as set forth.

4. In a grinding-machine, the combination, of the emery-wheel, the base carrying the same mounted on a slide, a gear for feeding said wheel to its work, an operating wheel or disk for said gear, formed with teeth around its edge, a pivoted spring-mounted dog arranged to engage said teeth, means for automatically operating the same, and a trip adjustably set adjacent to said teeth to come in contact with a part of said dog and throw it out of engagement with the teeth and stop the feed when a predetermined point has been reached, substantially as set forth.

5. In a grinding-machine, the combination of an emery-wheel, the feeding and operating mechanism, the supporting-casing and an automatically-operating mechanism mounted in fixed relation thereto on the same casing, for the feeding mechanism, substantially as set forth.

6. In a grinding-machine, the combination, of the grinding-wheel, the sliding base therefor, a vertical shaft mounted to move with said base and having a pinion on its lower end which engages with the stationary rack on a part beneath, a gear on its top end, a horizontally-extending shaft with a worm-gear engaging said gear, an operating wheel or disk on the outer end of said horizontal shaft having teeth formed on its edge, a dog pivoted on a part carried by a bracket secured to the casing surrounding the gear, said dog engaging said teeth and having a set-screw in its opposite end by which its motion may be limited to pass the number of teeth desired at each motion, a second dog loosely connected to the outer end of said first dog and hanging downward therefrom to engage a toothed operating-wheel, said wheel arranged to engage said dog and carry it back and forth over its top, and means for operating said wheel first in one direction and then the other by the back-and-forth movement of the carriage, substantially as set forth.

7. In a grinding-machine, the combination, of the grinding-wheel, the base carrying the same, means for adjusting the same to the work, an operating-shaft with a wheel or disk on its outer end, teeth being formed in the edge thereof, the pivoted dog engaging said teeth mounted on a part carried by the same part that carries the operating-shaft, the set-screw for limiting the motion of said dog, the second dog engaging the outer end of said first dog and an operating-wheel consisting of two parts secured together to have a motion between them, and the mechanism for automatically operating said wheel, substantially as set forth.

8. In a grinding-machine, the combination, of the grinding-wheel, the sliding base carrying the same, the gearing for feeding said wheel to the work, an operating-shaft, a wheel or disk with a toothed edge thereon, a dog pivoted on a part carried from the part containing the bearing of said shaft, in fixed relation thereto, and means for automatically operating said dog.

9. In a grinding-machine, the combination, of the grinding-wheel, the sliding base, the gear for feeding it forward, the wheel or disk for operating the same, having teeth in its edge, the pivoted dog engaging said teeth, the toothed wheel for operating said dog through a loosely-connected dog, the shaft carrying said toothed wheel, a pulley also on said shaft, and a rope or cable running over said pulley and held to the base of the machine at each end, whereby said parts are operated, first in one direction and then the other as the carriage travels back and forth on said base, substantially as set forth.

10. In a grinding-machine, the combination, with the automatic feeding mechanism, of a pivoted dog having means for limiting and regulating its movement, and a connection between said dog and its operating-wheel consisting of two parts mounted on each other to have a limited independent motion, and a spring between them to hold them to the limit of their length until said dog has reached the limit of its motion, whereby said dog may be given said different lengths of movement or stroke, substantially as set forth.

11. In a grinding-machine, the combination, of the grinding-wheel, the adjustable base, the gear for feeding it forward, the wheel or disk for operating said gear having teeth on its edge, a trip mounted on said wheel to be adjusted around said edge alongside said teeth, the dog engaging said teeth mounted on a spring in a socket in a pivoted bar to have a limited movement in said socket, a part of said dog arranged to meet said trip when it reaches the point, whereby said dog is forced out of engagement with the toothed wheel and the feed stopped, and the mechanism for automatically operating said pivoted dog from the carriage, substantially as set forth.

12. In a grinding-machine, the combination, of the grinding-wheel, the base adjustably mounted, the means for feeding it to the work, the wheel for operating said gear, a separate ring clamped onto the edge of said wheel and formed with teeth on its periphery, the vibrating dog arranged to engage the teeth, and the means for automatically operating the same, substantially as set forth.

13. In a grinding-machine, the combination, of the grinding-wheel, the sliding base carrying the same, the gear for feeding it to the work, the wheel for operating said gear, having teeth on its edge, an adjustable ring carrying a trip mounted on the edge of said ring, the pivoted dog for operating said wheel and having a part to meet said trip, and the means for automatically operating said dog, substantially as set forth.

14. In a grinding-machine, the combination with the automatic feeding mechanism for the emery-wheel, of a toothed wheel, a dog for operating it, a ring carrying a trip arranged to throw said dog out of engagement at a certain point, said ring being adjustable around the edge of said wheel, and having a pivoted lever on one side which carries a spring-dog which engages the teeth in the edge of the wheel, whereby by working said lever said ring and trip thereon is adjusted in relation to the edge of said wheel, substantially as set forth.

15. In a grinding-machine, the combination, with the feeding mechanism for the emery-wheel, of the operating-wheel, a separate ring clamped to its edge, and formed with a toothed edge, another ring carrying a trip adjustably mounted on said first ring, and the pivoted dog and the means for automatically operating it, substantially as set forth.

16. In a grinding-machine, the combination, of the grinding-wheel, the sliding base, the mechanism for positively feeding the same to the work, and a spring interposed between the rear portion of said sliding part and fixed point beneath, whereby any lost motion is taken up, and any forward movement of the wheel except by the positive feed is prevented, substantially as set forth.

17. In a grinding-machine, the combination, of the grinding-wheel, the base mounted on a slider, gear for feeding the same to the work, and a spring interposed between the slider and a fixed point beneath to force said slider back from the work against said gear, for the purpose described, said spring being U-shaped, whereby a substantially uniform tension is maintained regardless of the position of the slider, substantially as set forth.

18. In a grinding-machine, the combination, of the grinding-wheel, the base mounted on a slider, gear for feeding the same to the work, and a spring interposed between the slider and a fixed point beneath to force said slider back from the work against said gear, for the purpose described, said spring consisting of a plurality of spring parts with their adjacent legs connected to a union-piece, as $d^3$, whereby a substantially uniform tension is maintained regardless of the position of the slider, substantially as set forth.

19. In a grinding-machine, the combination, of the wheel and base mounted on a slider, gear for feeding said parts to the work, said slider mounted on a swiveled slide, said swiveled slide mounted on the carriage by means of the tapered flanges around correspondingly-formed recesses in their adjacent faces, and a clamping-ring with a groove in its periphery engaging said flanges, said ring being formed in sections, and means for expanding same, substantially as set forth.

20. In a grinding-machine, the combination, of the wheel and base mounted on a slider, gear for feeding said parts to the work, said slider mounted on a swiveled slide, said swiveled slide mounted on the carriage by means of the tapered flanges around correspondingly-formed recesses in their adjacent faces, and a clamping-ring with a groove in its periphery engaging said flanges, said ring being formed in sections, and operated by a clamping-pin between two of said sections which is cam-shaped in cross-section, substantially as set forth.

21. In a grinding-machine, the combination of the wheel, its shaft mounted to be adjusted longitudinally the base, the operating mechanism, the bearings for the emery-wheel shaft formed with spherical segments on their under sides, correspondingly-formed seats therefor in the wheel-base, and bolts secured in sockets in said segments and extending down through said base, whereby said bearings are adjustably clamped in place and perfect alinement secured without the danger of binding, substantially as set forth.

22. In a grinding-machine, the combination, of the carriage, the adjustable wheel-carrying parts thereon, the operating mechanism, the wheel-base, the bearings for the wheel-shaft thereon, the shaft mounted therein carrying the wheel, and a hood covering said bearings and the joints between the parts, substantially as set forth.

23. In a grinding-machine, the combination, of the adjustably-mounted parts carrying the wheel-base, the mechanism for operating the same, said base, the bearings for the wheel-shaft thereon, said shaft mounted in said bearings, and means for adjusting said shaft longitudinally consisting of the cap 13 secured to a shank on the end of said shaft, and engaging a socket in the rear bearing by a screw-threaded connection, a ring being connected to the inner face of said cap and slightly separated therefrom with springs interposed between them, whereby any lost motion caused by the wear of the parts is prevented and a tension is maintained, substantially as set forth.

24. In a grinding-machine, the combination, of the adjustably-mounted parts carrying the emery-wheel base, the mechanism for operating the same, the said base, the bearings for the wheel-shaft mounted on said base, the shaft carrying the wheel mounted in said bearings, and a hood 27 covering said parts, said hood being secured in place by tubular screws which project therethrough and into a screw-threaded upper end of oil-holes for said bearings, and caps on said screws, substantially as set forth.

25. In a grinding-machine, the combination, of the adjustably-mounted parts carrying the grinding-wheel, the mechanism for operating the same, and a hood 32 secured over said wheel, having its top edge open back from its point with upwardly-extending side flanges $f$ at this point, and a curved water-discharge nozzle clamped between said flanges, to close said open space and extend down over the face of the wheel to serve also as a guard, whereby, the hood is made as complete as possible and at the same time may be removed and replaced by simply loosening and removing said nozzle, without disturbing the adjustment of the wheel or other parts, substantially as set forth.

In witness whereof I have hereunto set my hand and seal, at Waynesborough, Pennsylvania, this 21st day of September, A. D. 1899.

ABRAHAM B. LANDIS. [L. S.]

Witnesses:
   GEO. H. RUSSELL,
   J. R. WOLFKILL.